Patented May 28, 1940

2,202,733

UNITED STATES PATENT OFFICE 2,202,733

ORGANIC ARSENIC COMPOUNDS AND METHOD OF OBTAINING THE SAME

Cliff S. Hamilton, Lincoln, Nebr., assignor to Parke, Davis & Company, Detroit, Mich., a corporation of Michigan No Drawing. Application June 14, 1937,
Serial No. 148,241

4 Claims. (Cl. 260—242)

The invention relates to aromatic arsenical compounds of the class represented by the following formula

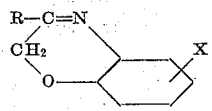

where R is an alkyl radical and X is an arsenic group of the class including arsonic acids and their soluble salts, arseno compounds, arsine oxides, thioarsenites and the water-soluble alkali metal salts thereof.

This application is a continuation in part of my co-pending application, Serial No. 604,658, filed April 11, 1932, now Patent No. 2,099,685 issued November 23, 1937.

Compounds of the above mentioned type are of considerable chemo-therapeutic value and are of a special utility in the treatment of certain trypanosome infections, such as syphilis. One of the specific compounds falling within the class of my invention is 3-methyl-6-arsono-benzoxazine having the following formula:

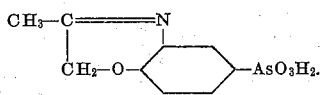

This compound can be prepared from certain arsenical compounds described in my co-pending application above referred to. For example, it may be prepared from 2-nitro-4-arsono-phenoxyacetone having the following formula:

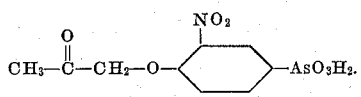

One method of preparing the same is as follows:
Nineteen grams of ferrous sulfate is dissolved in a small amount of water and 25 cc. of 30% sodium hydroxide added to the solution. To this mixture is added 5 grams of 2-nitro-4-arsonophenoxyacetone in dilute alkali solution. The whole is cooled and shaken vigorously during 10 minutes. The green ferrous hydroxide mud becomes dark in color as the reduction proceeds. When the reaction is complete, the mixture is filtered through a large Buchner funnel. The iron hydroxide mud is washed with cold water and the combined filtrates slightly acidified by the addition of concentrated hydrochloric acid. Upon scratching the sides of the beaker light tan crystals separate. These crystals are washed with cold, dilute hydrochloric acid and finally with water. The thoroughly dried product decomposes without melting.

Analysis: Subs., 0.2710, 0.2502, 37.45 cc. N/10 bromate solution. Calculated for $C_9H_{10}O_4NAs$: As, 27.66%. Found: As, 28.07, 28.03%.

Instead of using the ferrous sulfate reduction method outlined above, the conversion of the ortho nitro compound may be accomplished with alkaline hydrosulfite solution, or by any other reduction method capable of converting the nitro substituent of the aryl compound into an amino group such as catalytic or electrolytic reduction.

By the same method outlined above, other corresponding compounds may be prepared by substituting for 2-nitro-4-arsono-phenoxyacetone homologous compounds of the following formula

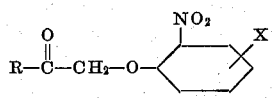

where R is an alkyl such as methyl, ethyl, propyl, etc., and X is an arsenic group of the class including arsonic acids and their soluble salts, arseno compounds, arsine oxide compounds, thioarsenites and the water-soluble alkali metal salts thereof.

The oxyketone arsonic acids having the formula

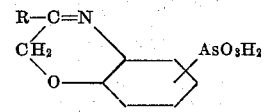

may be reduced to the corresponding arsenoxides by the methods described in the co-pending application above referred to, or by other methods known to the art, thereby yielding products having the formula:

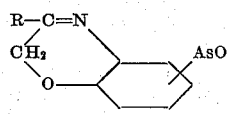

The oxides may be utilized as such, or they may be converted into water-soluble derivatives, as for example the thioarsenites. Thus with thioglycollic acids, the above compounds may be converted into

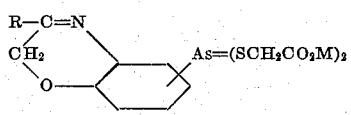

where M is hydrogen or an alkali metal.

Other forms of the arsenic group are the arseno compounds (—As=As—) and the water-soluble salts of the arsonic acids (—AsO₃M₂) where M is hydrogen, potassium, ammonium, lithium, calcium, sodium, or other inorganic basic constituents.

The examples given above are representative of various specific compounds falling within the class to which my invention is broadly related. It is to be understood that I have not given all of the formulas of substances embraced by my invention, but have merely shown that my invention is applicable to the preparation of a very large number of interrelated compounds, all of which have certain common characteristics.

What I claim as my invention is:

1. A compound designated by the formula

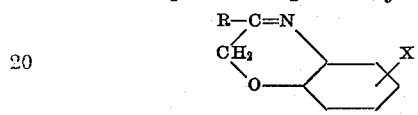

where R is a lower alkyl radical and X is an arsenic group of the class consisting of arsonic acids and their soluble salts, arseno compounds, arsine oxides, thioarsenites and the water-soluble alkali metal salts thereof.

2. A compound having the formula

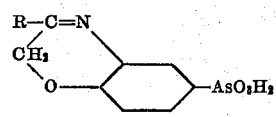

where R is a lower alkyl.

3. A compound having the formula

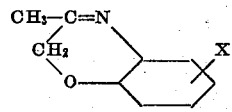

where X is an arsenic group of the class consisting of arsonic acids and their soluble salts, arseno compounds, arsine oxides, thioarsenites and the water-soluble alkali metal salts thereof.

4. A compound having the formula

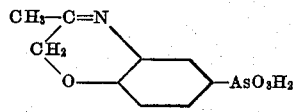

CLIFF S. HAMILTON.